United States Patent [19]

Falconer

[11] Patent Number: 4,535,206
[45] Date of Patent: Aug. 13, 1985

[54] ECHO CANCELLATION IN TWO-WIRE FULL-DUPLEX DATA TRANSMISSION WITH ESTIMATION OF FAR-END DATA COMPONENTS

[75] Inventor: David D. Falconer, Red Bank, N.J.

[73] Assignee: AT&T Bell Laboratories, Murray Hill, N.J.

[21] Appl. No.: 386,224

[22] Filed: Jun. 8, 1982

Related U.S. Application Data

[63] Continuation of Ser. No. 138,663, Apr. 9, 1980, abandoned.

[51] Int. Cl.³ .............................................. H04B 3/24
[52] U.S. Cl. ............................... 179/170.2; 179/170.6
[58] Field of Search .............. 179/170.2, 170.6, 170.8; 370/32

[56] References Cited

U.S. PATENT DOCUMENTS

| | | | |
|---|---|---|---|
| 3,499,999 | 3/1970 | Sondhi | 179/170.2 |
| 4,074,086 | 2/1978 | Falconer et al. | 179/170.2 |
| 4,087,654 | 5/1978 | Mueller | 179/170.2 |
| 4,131,767 | 12/1978 | Weinstein | 179/170.2 |

*Primary Examiner*—Gene Z. Rubinson
*Assistant Examiner*—Randall P. Myers
*Attorney, Agent, or Firm*—Ronald D. Slusky

[57] ABSTRACT

A full-duplex, two-wire Nyquist sampled data communication system includes an adaptive echo canceller (24) at each terminal (e.g., 10'). The echo canceller generates a replica ($z_m$) of the echo component of each sample ($r_M$) of the incoming signal. The replica and the sample are subtractively combined to provide an echo compensated signal ($S_M$). During intervals of simultaneous transmission and reception, i.e., double talk, the echo compensated signal may contain not only an uncancelled echo component but also a far-end data component. An adaptation error signal generator (80), operating in response to a stream of recovered data symbols (e.g., $\hat{a}_n$), estimates and removes the far-end data component from the echo compensated signal and, in response to the difference, generates an adaptation error signal ($\gamma E_{M-D}$). This signal is applied as an error signal to the echo canceller. This allows the echo canceller to adapt its set of tap coefficients in response to the uncancelled echo component present in the echo compensated signal. Thus, stable and accurate echo cancellation results even during a double-talk interval.

25 Claims, 4 Drawing Figures

ECHO CANCELLATION IN TWO-WIRE FULL-DUPLEX DATA TRANSMISSION WITH ESTIMATION OF FAR-END DATA COMPONENTS

This is a continuation, of application Ser. No. 138,663, filed Apr. 9, 1980, now abandoned.

BACKGROUND OF THE INVENTION

1. Field of the Invention

This invention relates to the cancellation of echo signals from transmitted digital data. In particular, it relates to the cancellation of echo signals from digital data transmitted over two-way, two-wire telephone transmission channels.

2. Description of the Prior Art

In the field of data communications, it is often advantageous for traffic to be carried over a single communication line (link, channel) in two directions simultaneously. That is, the traffic is full-duplex. A typical transmission medium is a two-wire telephone channel within the public switched direct-distance-dialing (DDD) network. The passband of such a two-wire channel extends from approximately 300 to 3000 hertz. For full-duplex data transmission the available bandwidth can be divided in half, with each half being allocated to a particular transmission direction. However with this method, accurate data transmission can only be achieved at half the rate that could be achieved in one-way (half-duplex) transmission. One way to increase the full-duplex data rate is to use two physically separate two-wire lines, with each line carrying a full bandwidth one-way signal in a respective one of the two transmission directions. This is referred to as a four-wire channel.

Alternatively, high speed, full-duplex transmission can be carried out over a single two-wire channel by using hybrid coupling networks. These networks, positioned at both the so-called near and far ends of the two-wire channel, accept a four-wire signal and convert it into a two-wire signal for transmission over a two-way, two-wire telephone channel. For optimally interference-free transmission, the impedance of the port of the hybrid which interfaces with the channel must exactly match the impedance of the two-wire channel. In practice, however, this is seldom possible.

Specifically, the switched nature of the DDD network means that a large number of communication channels of differing impedance are connected over time to the hybrid. Because the hybrid is designed to operate over as many differing communication channels as practicable, there is generally a mismatch between the hybrid and the channel. Such a mismatch causes a portion of the signal which was transmitted from the near end to be reflected from the channel/far-end hybrid connection point back into the channel. As in voice transmission, this distant reflected signal is referred to as echo. A data receiver is typically unable to distinguish between data from the far end and the echo of data from the near end. Thus, there is a potential for the near-end receiver to erroneously interpret the echo reflected from the far end as far-end data.

This problem can be handled through the use of echo cancellers. These produce a signal which is essentially a replica of the echo component present in an incoming signal, i.e., the signal applied from the two-wire channel to the near-end hybrid. Specifically, each of a predetermined number of previous consecutive symbols in the transmitted signal, in addition to being transmitted, is stored in the echo canceller. Each such symbol is multiplied therein by a respective tap coefficient. The resulting products are summed to produce the replica signal. A resultant substantially echo-free signal, hereinafter referred to as an echo compensated signal, is obtained by subtracting the replica signal from the incoming signal. The echo compensated signal is applied to a data receiver, which, after processing such as equalization and demodulation, forms decisions as to the values of the transmitted data symbols.

In general, the echo cancellation process is not perfect. Rather the echo compensated signal may contain an uncancelled echo component. It may also contain a far-end data component as described more fully below. In either case, the magnitude of the uncancelled echo component is indicative of the current effectiveness of the echo cancellation process. A large uncancelled echo component means that the replica signal is an inaccurate replication of the echo component sought to be cancelled. In so-called adaptive echo cancellers, the echo compensated signal is advantageously used as an error signal in response to which the values of all of the tap coefficients are adaptively updated in such a way that the uncancelled echo component is minimized. This assures that the replica signal continuosly and, to the extent possible, accurately duplicates the echo component present in the incoming signal, even if the characteristics of the channel change.

The arrangement taught in U.S. Pat. No. 4,087,654 issued May 2, 1978 to K. H. Mueller is illustrative of the so-called baud rate adaptive echo cancellers. In these structures, sampling of the incoming signal, replication of the echo component and echo cancellation all occur at the baud (symbol) rate. Although possessing structural simplicity, these cancellers are highly sensitive to variations in the synchronous timing between the near-end transmitted signal, which is used to define the echo signal replica, and the received data, whose timing is determined at the far end. Moreover, the echo-compensated signal is available to the reveiver only at the baud sampling rate. This severely restricts the receiver's ability to accurately recover timing from the far-end signal.

Alternatively, canceller operation at the Nyquist rate has been suggested. Nyquist sampled schemes, which alleviate the above-described timing problem, are exemplified by S. B. Weinstein in U.S. Pat. No. 4,131,767 issued Dec. 26, 1978 and in "A Passband Data-Driven Echo Canceler for Full-Duplex Transmission on Two-Wire Circuits", *IEEE Transactions on Communications,* Vol. COM-25, No. 7, July 1977, pages 654–666, and by K. H. Mueller in " A New Digital Echo Canceler for Two-Wire Full-Duplex Transmission", *IEEE Transactions on Communications,* Vol. COM-24, No. 9, September 1976, pages 956–962. In contrast to baud rate cancellers, Nyquist rate cancellers perform sampling of the incoming signal, echo replica generation and echo cancellation all at the Nyquist rate. Tap coefficient adaptation in the Nyquist arrangements is satisfactory in full-duplex systems during intervals of one-way transmission. However, adaptation is unreliable during intervals of double talk, or two-way transmission, i.e., the simultaneous transmission of far-end and near-end data. These problems arise because the echo compensated signal which feeds the adaptive structure contains not only the uncancelled echo component during double-talk intervals, but also a far-end data component. The far-end data is uncorrelated with respect to the echo.

Adaptation and, hence, echo replica generation in response to this signal are thus either unreliable and inaccurate, or is very slow. Thus erroneous data recovery may result. (Baud rate structures are unaffected by these problems because the error signal used to update the echo canceller tap coefficients is taken from a different point in the system, where the far-end data has been determined, and hence has been subtracted out. As such, the error signal is not corrupted by the presence of far-end data.)

Prior art solutions to the above-mentioned problems with Nyquist cancellers include the use of a double-talk detection circuit to halt adaptation and freeze the tap coefficients to their pre-double-talk values for use during the double-talk intervals. See, for example, U.S. Pat. No. 3,499,999 issued Mar. 10, 1970 to M. M. Sondhi. Alternatively, as disclosed by Weinstein in the above-cited paper, a running average of a predetermined number of prior coefficient values for each tap can be used in place of the adaptive coefficients during double-talk intervals. While these solutions stabilize system operation, echo cancellation during the double-talk intervals is potentially inaccurate. This is due to the inability of the tap coefficients to adjust during the double-talk intervals to changes in the echo channel impulse response occurring during those intervals.

SUMMARY OF THE INVENTION

Accordingly, it is an object of this invention to provide for improved performance of echo cancellers during periods of double talk.

A more particular object of this invention is to provide for improved performance of Nyquist sampled echo cancellers during periods of double talk.

A yet more particular object of this invention is to provide a Nyquist sampled echo canceller which is accurate and stable during periods of double talk even if the characteristics of the echo channel change.

These and other objects are achieved in accordance with the invention by substantially removing the far-end data component from the echo-compensated signal prior to its application as an error signal to the adaptive echo cancelling structure. This function is illustratively provided by what is hereinafter referred to as an adaptive reference former.

Specifically, the adaptive reference former processes a predetermined number of previous receiver decisions to generate at the Nyquist rate an estimate of the far-end data component present in the echo compensated signal. This estimate is, more particularly, a linear combination of the previous receiver decisions, and is generated by multiplying each of the previous receiver decisions by a respective tap coefficient and combining the resulting products. This generated estimate of the far end data is used to generate an adaptation error signal, the value of which is equal to the difference between the echo compensated signal and the estimate of the far-end data component. This error signal rather than the echo compensated signal is used as the error signal for the adaptive echo canceller. Consequently, echo canceller tap coefficient adaptation is carried out solely in response to uncancelled echo components. This allows for consistently stable and accurate echo cancellation during both double talk and one-way transmission.

In accordance with a feature of this invention, the adaptation error signal is fed back to the adaptive reference former as an update error signal for use in adaptively updating the tap coefficients of the adaptive reference former. This ensures that the estimate of the far-end data continuously and accurately reflects the far-end data component present in the incoming signal.

BRIEF DESCRIPTION OF THE DRAWING

The invention may be clearly understood from a consideration of the following detailed description and accompanying drawing in which.

DETAILED DESCRIPTION

Figure 1:
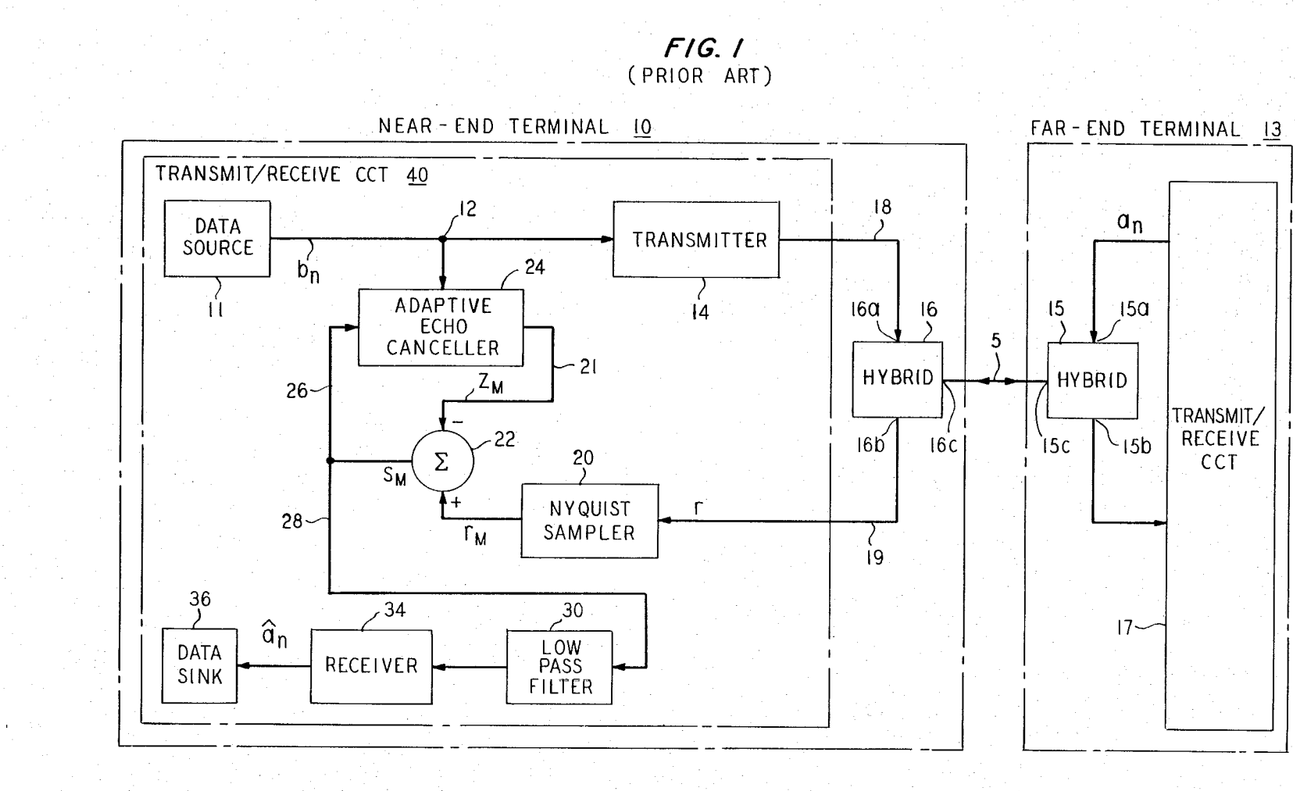
FIG. 1 is a block diagram of a prior art full-duplex, two-wire digital data transmission system having a Nyquist sampled echo cancellation feature.

FIG. 1 depicts a full-duplex digital data transmission system of a type known in the art. In essence, this system is comprised of a two-wire communication link 5 connecting two data terminals, a near-end terminal 10 and a far-end terminal 13. Communication link 5 is illustratively contained within the public switched DDD network, although the invention is equally applicable to other types of communication links, e.g., customer loops. Communication link 5 is a two-way link; that is, it carries data signals from each of the two terminals to the other. Terminals 10 and 13 are of the general type shown and described in the above-cited Weinstein patent. Both terminals are, illustratively, identical in structure and operate in the same manner. Hence, the ensuing discussion is substantially limited to near-end data terminal 10.

Terminal 10 is comprised of transmit/receive circuitry 40 and hybrid 16. Circuitry 40 includes a transmission section which contains data source 11 and transmitter 14. Data source 11 produces a baseband stream of near-end data symbols $b_n$, $n=0,1,2,\ldots$. The subscript n advances at the baud rate. Symbols $b_n$ are applied to transmitter 14 for conventional shaping and modulation.

The transmission section, as well as the reception section, to be described shortly, interfaces with hybrid 16. The latter permits the connection of a pair of two-wire lines, i.e., a four-wire line, to two-way, two-wire communication link 5. Specifically, the hybrid contains three two-wire ports 16a, 16b and 16c. The outgoing signal, i.e., the output of transmitter 14, is applied to two-wire port 16a via two-wire line 18. Hybrid 16 routes this signal to communication link 5 via port 16c. An incoming signal from the far end, on the other hand, appearing on communication link 5 and incident at port 16c, is routed by hybrid 16 to port 16b. From there the incoming signal, r, representing a train of far-end data symbols, is fed over a separate two-wire line 19 to the reception section of near-end data terminal 10. Similarly, far-end hybrid 15 connects transmit/receive circuitry 17 (which is similar to circuitry 40) to port 15c and communication link 5 through a pair of two-wire lines appearing at ports 15a and 15b.

For optimally interference-free transmission, the output impedance of both near-end hybrid 16 and far-end hybrid 15, must exactly match the impedance of communication link 5. However, in practice, this is seldom possible. For example, in the switched DDD network, a large number of differing communication links are connected over time between hybrids 15 and 16. Because the hybrids are designed to operate over as many differing communication channels as practicable, an impedance mismatch generally occurs, for example, between far-end hybrid 15 and communication link 5. This causes a sizeable portion of the transmitted near-end signal incident at far-end hybrid 15 to be reflected back into communication link 5 as echo. After a finite time interval, the echo appears at port 16c of near-end hybrid 16. The reception section of near-end data terminal 10 is unable to distinguish between the incoming data and the echo. However, the inclusion in the reception station of echo canceller 24 (to be discussed shortly) prevents the echo from interfering with the data recovery process.

As previously noted, incoming signal r received from communication link 5 is routed through hybrid 16 via port 16b to the reception section of data terminal 10. Therein this signal is first applied to Nyquist sampler 20. The latter finely samples signal r at at least the Nyquist rate, i.e., a rate equal to at least twice the highest possible frequency present in the incoming signal. For purposes which will become appearent later, the Nyquist rate is illustratively an integer multiple, P, of the baud rate. Sample $r_M$ is one such resulting sample, i.e., the $M^{th}$ sample of a stream of samples of the incoming signal. Subscript M advances at the Nyquist rate. In the general case, signal r is comprised of both far-end data and echo signals. Thus a portion of the magnitude of sample $r_M$ is due to far-end data and another portion is due to echo. These portions of sample $r_M$ will be respectively referred to hereinafter as the far-end data component and the echo component. As the result, for example, of Nyquist sampling, inter-symbol interference and other distortion, it should be appreciated that the value of the data component of sample $r_M$ of the incoming signal does not reflected the value of any particular transmitted symbol.

The problem to which the present invention is directed will now be illustrated by first assuming that at any one time, only one-way communication is carried over communication link 5, i.e., double talk is precluded. Furthermore, hybrid 16 is assumed to be leak-free, i.e., the outgoing transmitted signals applied to port 16a will not travel through the hybrid and appear at port 16b.

Under these conditions, sample $r_M$ is comprised of solely a far-end data component or solely an echo component. During periods of reception, for example, sample $r_M$ is comprised only of a far-end data component, i.e., it is echo-free. Sample $r_M$ is applied to combiner 22 wherein it is subtractively combined with echo replica signal $z_M$, the latter being the $M^{th}$ one of a stream of echo replica signals provided by adaptive echo canceller 24 on lead 21. More particularly, echo replica signal $z_M$ is an estimate by adaptive echo canceller 24 of the echo component of sample $r_M$. Since that component is, by assumption, zero, echo replica signal $z_M$ is also zero. Thus sample $r_M$ passes substantially unchanged through combiner 22. The output of combiner 22 is a stream of echo compensated signals, $S_M$ being the $M^{th}$ one of said stream. In this case, echo compensated signal $S_M$ is substantially equal to the far-end data component of sample $r_M$. The echo compensated signal is applied over lead 28 to low-pass filter 30 which reconstructs a continuous wave therefrom. The filter output, in turn, is applied to receiver 34 where it may be sampled, e.g., at the baud rate, further filtered (equalized) to combat intersymbol interference, and quantized to produce decisions $â_n$, n=0,1,2, . . . , as to the value of the $n^{th}$ transmitted far-end symbol $â_n$. Decision $a_n$ is applied to data sink 36.

Echo compensated signal $S_M$ is also fed back as an error signal over lead 26 to adaptive echo canceller 24, as discussed more fully below. However, as long as no data symbols are provided by source 11, echo canceller 24 maintains the value of echo replica signal $z_M$ at zero.

Alternatively, during periods of one-way transmission by terminal 10 (again assuming no double-talk), sample $r_M$ is comprised solely of the echo component produced by the near-end transmitted signal reflecting off the impedance mismatch at the channel/far-end hybrid connection point. Echo replica signal $z_M$ is now non-zero. More specifically, echo canceller 24 generates echo replica signal $z_M$ by operating on a predetermined number of prior consecutive symbols within the data sequence produced by data source 11. These symbols are stored within the echo canceller in a transversal structure. Physically this structure can be, for example, an analog delay line, a shift register or a random access memory. The echo canceller generates a linear combination of prior consecutive symbols by multiplying each individual symbol by a respective tap coefficient. The resulting products are summed together to produce echo replica signal $z_M$. Since far-end terminal 13 is not transmitting at this time, echo compensated signal $S_M$ is solely comprised of an uncancelled echo component. As previously mentioned, signal $S_M$ is fed back over lead 26 as an error signal to echo canceller 24. In response to this error signal, the values of the tap coefficients are adaptively updated to ensure that the echo replica signal, to the extent possible, accurately duplicates the echo component of sample $r_M$. In this manner, the uncancelled echo component remaining in the echo compensated signal is minimized.

While the arrangement of FIG. 1 performs satisfactorily during one-way operation as just described, it possesses serious drawbacks for two-way operation, i.e., during intervals of double-talk. Specifically, whenever terminals 10 and 13 transmit concurrently, echo of the near-end transmitted data exists on communication link 5 simultaneously with the far-end data transmitted by far-end terminal 13. Thus the error signal applied to echo canceller 24 over lead 26 contains not only an uncancelled echo component but also a far-end data component. This error signal is thus corrupted by the far-end data component. The echo canceller is unable to distinguish between the echo component and the far-end data component. Furthermore, the far-end data is uncorrelated with respect to the echo. Hence adaptation is either unreliable and inaccurate or is very slow. Thus improper echo cancellation may result.

The present invention is directed to a method and arrangement for providing accurate, stable and reliable adaptation and echo cancellation during periods of double-talk. In accordance with the invention, this is achieved by substantially removing the corrupting far-end data component from the echo-compensated signal to generate an adaptation error signal. This adaptation error signal is equal to a combination of the echo replica signal $Z_M$, sample $r_M$ and an estimate (discussed below) of the far-end data component associated with sample $r_M$. The adaptation error signal, rather than the echo compensated signal, is applied as an error signal to the adaptive echo cancelling structure.

Figure 2:
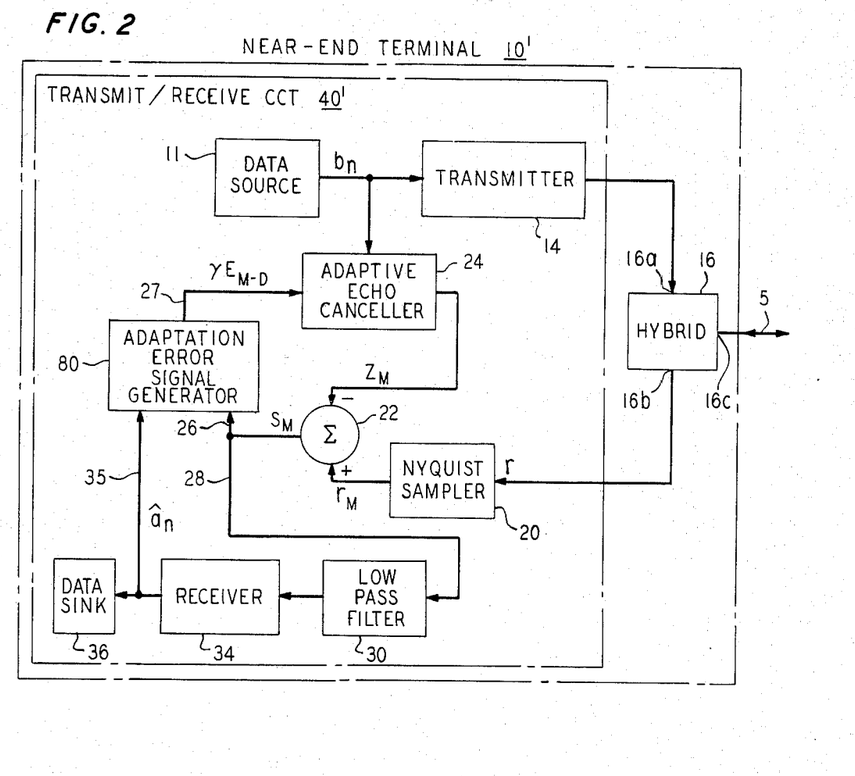
FIG. 2 is a block diagram of a Nyquist sampled data terminal according to this invention.

FIG. 2 depicts a data terminal 10' containing an adaptive echo cancelling arrangement according to this invention. The basic difference between terminal 10' and the prior art terminal 10 is that transmit/receive circuitry 40' in the former includes adaptation error signal generator 80. The adaptation error signal generator accepts as input and processes both the receiver decisions appearing on lead 35 and echo compensated signal $S_M$ appearing on lead 26. The output, appearing on lead 27, is a stream of adaptation error signals of which $\gamma E_{M-D}$ is the $(M-D)^{th}$ one of said stream. The remaining elements of terminal 10' are similar to and carry the same reference number as the corresponding elements in terminal 10.

Figure 3:
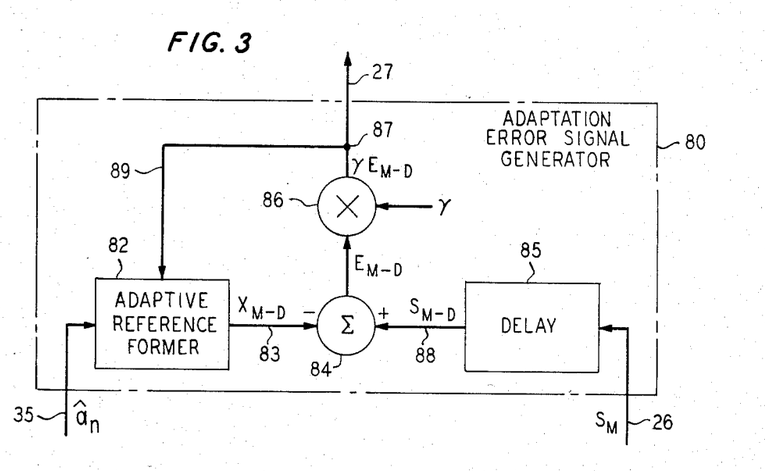
FIG. 3 is a block diagram of the circuitry within the terminal of FIG. 2 which generates the adaptation error signal of this invention.

FIG. 3 details the constituent circuit blocks of adaptation error signal generator 80. Specifically, receiver decisions, e.g., decision $\hat{a}_n$, are applied to adaptive reference former 82. The decisions are processed in the adaptive reference former to produce on lead 83 a stream of estimates, with each estimate approximating the far-end data component of a particular one of the samples of the incoming signal applied to combiner 22. There is a processing delay of D Nyquist intervals from the output of combiner 22 to the output of receiver 34. Thus, at the point in time that echo compensated signal $S_M$ appears on lead 26 (FIG. 2), the signal appearing on lead 83 is an estimate $X_{M-D}$ of the data component of the echo compensated signal generated D Nyquist intervals earlier, i.e., signal $S_{M-D}$. Generator 80 includes a delay 85, which imparts a delay of D Nyquist intervals to the echo compensated signals extended thereto on lead 26. Thus, delayed echo compensated signal $S_{M-D}$ appears on output lead 88 of delay 85 at the same time that estimate $X_{M-D}$ appears on lead 83. The latter is subtracted from the former in combiner 84 to produce error signal $E_{M-D}$.

Error signal $E_{M-D}$, of course, reflects not the current echo cancellation error, but rather, that which existed D Nyquist intervals in the past. That signal can nonetheless be used as the basis for updating the tap coefficients employed in echo canceller 24. In particular, error signal $E_{M-D}$ is multiplied in multiplier 86 by a parameter $\gamma$ to produce adaptation error signal $\gamma E_{M-D}$. Parameter $\gamma$, which is much less than unity, is selected to ensure smooth, stable convergence, i.e., minimal under- and over-shooting in the response of adaptive echo canceller 24 to step changes in the characteristics of communication link 5. (In the present illustrative embodiment, the value of parameter $\gamma$ is fixed; however, in other embodiments it may be advantageous to dynamically adjust the value of $\gamma$ to equal the reciprocal of the mean squared value of all of the data symbols stored in the adaptive reference former.

As described more fully below, adaptive reference former 82 receives an update error signal for purposes of updating tap coefficients used therein. Like the adaptation error signal, the update error signal is also equal to the product of error signal $E_{M-D}$ with a predetermined parameter. Thus, the adaptation and update error signals are proportional to one another. In this embodiment, more particularly, the two are equal. Thus, as shown in FIG. 3, adaptation error signal $\gamma E_{M-D}$, in addition to being applied to adaptive echo canceller 24 over lead 27, is fed back to adaptative reference former 82 over lead 89.

It may be desired, however, for the update error signal applied to adaptive reference former 82 to be different from the adaptation error signal, thereby providing the reference former and echo canceller with different error sensitivites. This could be accomplished, for example, by taking lead 89 from the output of a second multiplier (not shown) rather than from the output of multiplier 86. This second multiplier, like multiplier 86, would receive an input from the output of combiner 84 but would multiply that output by a different parameter.

Figure 4:
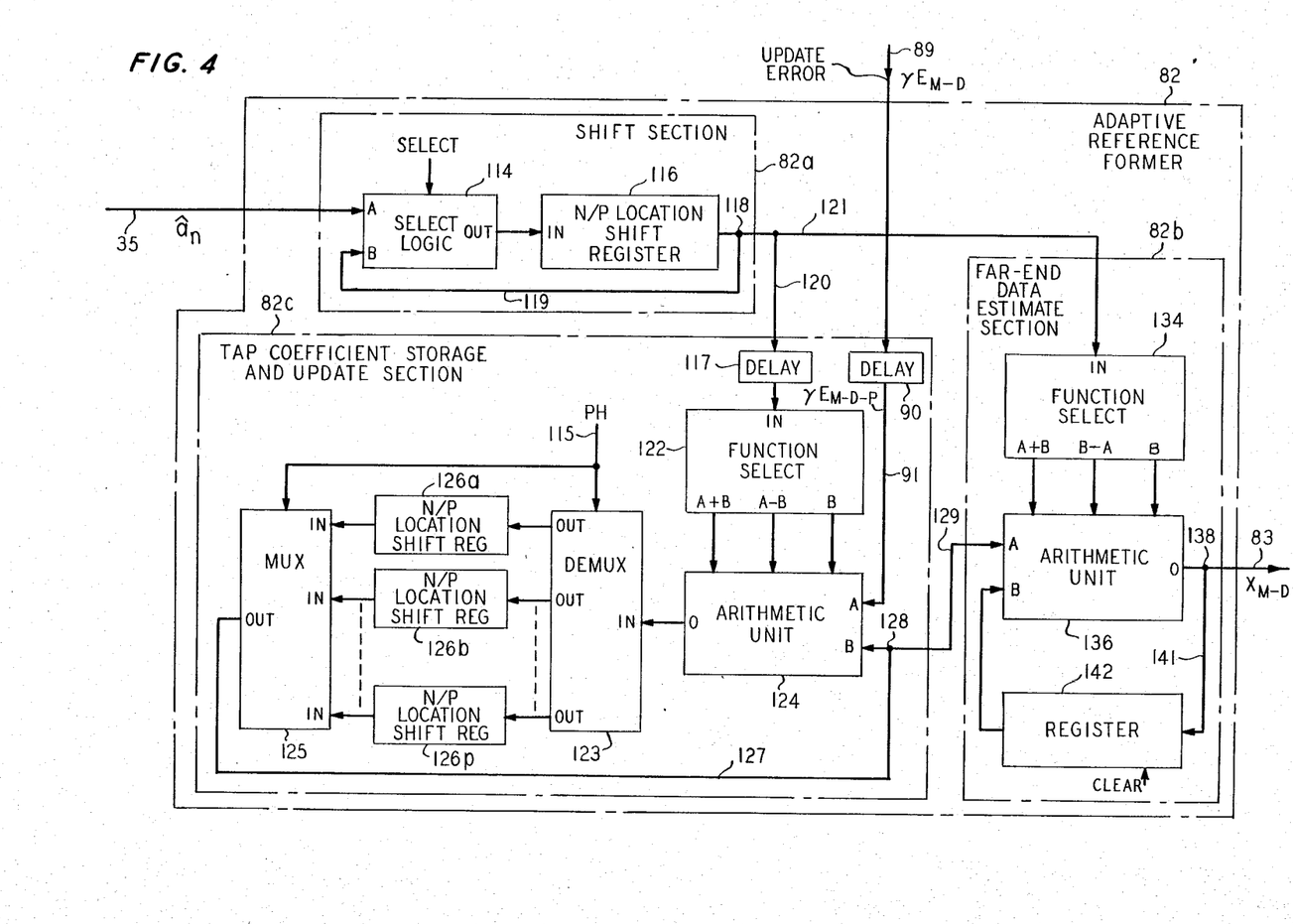
FIG. 4 is a block diagram of the adaptive reference former used in the circuitry of FIG. 3.

As depicted in FIG. 4, adaptive reference former 82 is comprised of shift section 82a, far-end data estimate section 82b, and tap coefficient storage and update section 82c. Operation within each section takes place within a processing cycle, the duration of which is no greater than a Nyquist interval. This allows a new estimate of the far-end data component to be produced for each output of Nyquist sampler 20.

The Nyquist rate is illustratively P times the baud rate, where P is an integer. Thus, P far-end data component estimates must be produced within any baud interval. Only one receiver decision is applied to the adaptive reference former during each baud interval. In accordance with an aspect of the invention, however, adaptive reference former 82 forms each of the P estimates as a respective linear combination of a common set of (N/P) previous receiver decisions, each linear combination being formed using a particular one of P sets of (N/P) tap coefficients, N being a selected number, equal to the number of Nyquist intervals over which the decisions stored in adaptive reference former 82 extend.

More specifically, shift section 82a is comprised of select logic 114 and (N/P) location shift register 116. Together these two units function as a right circular shift register of length (N/P). At the occurrence of each receiver decision e.g., $a_n$, on lead 35, a select signal from timing circuitry (not shown) within terminal 10' is applied to select logic 114. This causes the receiver decision $\hat{a}_n$ to pass through select logic 114 to the input of shift register 116. However, at all other times, select logic 114 applies the output of shift register 116 occurring on lead 119 to the input of the same shift register. Hence, at all times, shift register 116 contains the most recent receiver decision $\hat{a}_n$ and $(N/P)-1$ previous receiver decisions. Within shift register 116, these decisions are ordered in terms of occurrence. For example, just after the select logic admitted a new decision, the "oldest" decision, i.e., $a_{n-((N/P)-1)}$ is stored at the rightmost (output) location, and the next oldest decision is stored one location to the left, and so forth. Moreover, the contents of shift register 116 are shifted N/P times during each Nyquist interval (procesing cycle), such that within each processing cycle, a sequence of the (N/P) stored receiver decisions appears at junction 118. Thus, within each baud interval, this sequence of (N/P) ordered past receiver decisions is applied P times to junction 118. Furthermore, register 116 is shifted one location to the right just before each new receiver decision is applied thereto. From junction 118, the complete sequence is applied through leads 121 and 120 to sections 82b and 82c, respectively.

Far-end data estimate section 82b utilizes the $i^{th}$ one of P sequences of tap coefficients during the $i^{th}$ processing cycle to produce far-end data estimate $X_{M-D}$. The following equation governs the operation of this section:

$$X_{M-D} = \sum_{K=1}^{N/P} W_n^K(i)\hat{a}_{n-K+1} \text{ for } i = mod_p(M) \qquad (1)$$

In this equation, $W_n^k(i)$ represents the current value of the $K^{th}$ coefficient in the $i^{th}$ one of the P coefficient sequences. The value of the modulo function $mod_p(M)$ is equal to the remainder of the quotient (M/P), e.g., i=3 for M=11, P=4. Thus, each far-end data estimate formed during a given baud interval is seen to be a linear combination of a common, i.e., the same, set of (N/P) past receiver decisions, each linear combination being formed with a respective one of P sets of N/P tap gain coefficients.

Specifically, during the first Nyquist interval within the $n^{th}$ baud interval, the common set of N/P previous receiver decisions $\hat{a}_{n-K+1}$, K=1,2,..., N/P is linearly combined using the first sequence of tap gain coefficients i.e., $W_n^K(1)$ K=1,2,..., (N/P) to produce the first of P far-end data component estimates. Throughout the succeeding Nyquist intervals within the same baud interval, the same set of (N/P) receiver decisions is combined with a different set of (N/P) tap gain coefficients to produce further estimates of the far-end data. This process continues until the common set of (N/P) receiver decisions has been processed with all P sets of (N/P) tap gain coefficients.

Far-end data estimate section 82b is comprised of function select 134, arithmetic unit 136 and register 142. In the present illustrative embodiment, each receiver decision $\hat{a}_n$ is ternary, i.e., it can taken on one of three values: +1, −1 or 0. To calculate each term in the summation given by equation (1) above, function select 134 ascertains the value of each receiver decision on lead 121 and, depending upon the particular value, instructs arithmetic unit 136 to perform a particular operation on the signals presented to the latter's A and B inputs. More specifically, if the receiver decision is +1, arithmetic unit 136 is instructed to add the values presented to its A and B inputs. If the receiver decision is −1, arithmetic unit 136 is instructed to subtract the value presented to its A input from that presented to its B input. In either case, the result is applied to output O. Thirdly, if the receiver decision is zero, arithmetic unit 136 merely applies the value presented to its B input to output O. The signal applied to input B is the output of register 142 and that presented to input A is the sequence of tap coefficients $W_n^K(i)$ K=1,2, ..., N/P. Register 142 is used to temporarily store the result produced by arithmetic unit 136 and apply it to the latter's B input for use in the subsequent calculation. The contents of register 142 are set to zero at the beginning of each processing cycle by the application of a clear signal (generated from circuitry not shown). Thus by temporarily storing successive results, register 142 contains a running total of the results of all the prior operations performed during a nyquist interval in the course of calculating equation (1). At the conclusion of each processing cycle, within which (N/P) decisions and tap coefficients have been processed, the output signal of arithmetic unit 136 which appears at junction 138 and on lead 83 is the estimate $X_{M-D}$ of the far-end data component.

Tap coefficient storage and update section 82c provides and adaptively updates the P tap gain coefficient sequences. In particular, a coefficient is updated by modifying its value by a correction factor equal to the product of an update error signal—which in this embodiment is equal to an adaptation error signal—with a receiver decision.

Specifically, the coefficients in a particular sequence must be updated in response to the particular update error signal which was formed as a result of the use of that sequence in section 82b. Thus the coefficients of the $i^{th}$ sequence could be updated in response to signal $\gamma E_{M-D}$ where, as in equation (1), i=$mod_p(M)$. However, as will be apparent from the discussion below, the values of the coefficients in the $i^{th}$ sequence are updated in this embodiment before estimate $X_{M-D}$, and thus signal $\gamma E_{M-D}$, are formed.

As a result, section 82c updates the coefficients of the $i^{th}$ sequence in response to signal $\gamma E_{M-D-P}$. The latter is equal to that one of the P adaptation error signals formed in the previous, i.e., $(n-1)^{st}$, baud interval which corresponds to the $i^{th}$ coefficient sequence.

As previously noted, the updating process includes multiplication of the update error signal with a receiver decision. The latter is that decision by which the coefficient being updated was multiplied in the baud interval in which the error signal was formed. In this embodiment, then, the appropriate decision is $a_{n-K}$, K=1,2,.. . (N/P).

As a consequence of the foregoing, operation of section 82c, i.e., adaptation of the tap coefficients, is governed by the following equation:

$$W_{n+1}^K(i) = W_n^K(i) + \gamma E_{(M-D-P)}\hat{a}_{n-K} \text{ for } \begin{cases} K = 1,2\ldots,\dfrac{N}{P} \\ i = mod_p(M) \end{cases} \qquad (2)$$

From this equation it is seen that a different one of the P sequences of tap coefficients is updated during every processing cycle so that each one of the P tap coefficient sequences is updated during each baud interval.

Tap coefficient storage and update section 82c is comprised of one-baud delays 90 and 117, function select 122, arithmetic unit 124, demultiplexer 123, shift registers 126a through 126p, and multiplexer 125. Function select 122 operates in a manner similar to function select 134 in section 82b. In particular, function select 122 instructs arithmetic unit 124 to perform one of three operations in its A and B inputs in order to calculate updated tap coefficient $W_{n+1}^K(i)$ according to equation (2). More specifically, depending upon the value, i.e., +1, −1 or 0, of each of the receiver decisions provided from one-baud delay 117, arithmetic unit 124 provides as the value of the updated coefficient the sum of the values of the signals presented to its A and B inputs, the difference between the values of those signals or the value of the signal presented to the B input, respectively. The signal presented to input A via lead 91 is signal $\gamma E_{M-D-P}$, provided by one-baud delay 90. The signal presented to input B via lead 127 and junction 128 is the value of the tap coefficient $W_n^K(i)$.

Within section 82c, each set of (N/P) tap coefficients is held in a respective one of P shift registers, 126a, 126b, ... 126p. The value of signal PH, provided on lead 115, indicates which of the P sets of tap coefficients is to be routed through demultiplexer 123 and multiplexer 125. The value of signal PH is incremented during each successive processing cycle and is reset at the beginning of each baud interval. In this manner, a different set of (N/P) tap coefficients is selected for updating during every processing cycle, and all P sets are updated during each baud interval.

Although a specific illustrative embodiment has been shown and described herein, this merely illustrates the principles of the present invention. Many and varied arrangements embodying those principles may be devised by those skilled in the art without departing from the spirit and scope of the invention.

I claim:

1. An arrangement for processing samples of an incoming signal which is corrupted by echoes of a transmitted signal representing a train of transmitted near-end data symbols, said incoming signal representing a train of transmitted far-end data symbols and said samples having respective far-end data components and echo components, said arrangement comprising echo cancelling means operative in response to a stream of said transmitted near-end data symbols and a stream of adaptation error signals for generating a replica of each of said echo components, and signal processing means for producing a stream of echo compensated samples as a function of the difference between each of said samples and the replica of its echo component and for forming decisions as to the values of said transmitted far-end data symbols in response to said echo compensated signals, and means for generating an individual one of said adaptation error signals as a function of said difference between an individual one of said samples and the replica of its echo component and as a function of an estimate signal, said estimate signal being substantially equal to the far-end data component of said individual one of said samples, said generating means including reference former means for forming said estimate signal as a function of individual ones of said decisions and as a function of at least ones of said stream of adaptation error signals.

2. The invention of claim 1 wherein said reference former means is comprised of estimating means for linearly combining said individual ones of the decisions to form said estimate signal.

3. The invention of claim 2 further comprising means for generating a plurality of coefficients and wherein said estimating means performs said linear combining by multiplying said individual ones of the decisions by respective ones of said coefficients and summing the resulting products.

4. The invention of claim 3 wherein said one of said adaptation error signals is substantially equal to an error signal multiplied by a predetermined parameter, said error signal being a function of said estimate signal and a function of said difference between said individual one of said samples and said replica of its echo component.

5. The invention of claim 4 wherein said reference former means is further comprised of update means for updating the value of each of said respective coefficients as a function of said individual ones of said decisions and as a function of said error signal.

6. The invention of claim 5 wherein in said update means said value of said each of said respective coefficients is updated in response to the product of said error signal with a predetermined parameter.

7. The invention of claim 5 wherein said update means updates the value of each of said respective coefficients in response to the product of said error signal with the one of said decisions with which said each respective coefficient was multiplied.

8. An arrangement for processing a stream of samples of an incoming signal which is corrupted by echoes of a transmitted signal representing a train of transmitted near-end data symbols, said stream of samples representing a train of transmitted far-end data symbols and said samples having respective far-end data components and echo components, said arrangement comprising echo cancelling means operative in response to a stream of said transmitted near-end data symbols and a stream of adaptation error signals for generating a stream of replicas of said echo components, and signal processing means for producing a stream of echo compensated samples as a function of the difference between each of said samples and the replica of its echo component and for forming decisions as to the values of the individual transmitted far-end data symbols in said train in response to said echo compensated signals, and means for generating said stream of adaptation error signals as a function of said difference between each one of said samples and the replica of its echo component and as a function of a stream of estimate signals, said estimate signals being substantially equal to the far-end data components of associated ones of said samples, said generating means including reference former means for forming said estimate signals as a function of said decisions and said stream of adaptation error signals.

9. The invention of claim 8 wherein said reference former means includes estimating means for linearly combining individual ones of said decisions to form said estimate signals.

10. The invention of claim 9 further comprising means for generating a plurality of coefficients and wherein said estimating means includes means for performing said linear combining by multiplying said individual ones of said decisions by respective ones of said coefficients and summing the resulting products.

11. The invention of claim 10 wherein each of said adaptation error signals is substantially equal to an error signal multiplied by a predetermined parameter, said error signal being a function of a respective one of said estimate signals and a function of said difference between its associated sample and the replica of the echo component of said associated sample.

12. The invention of claim 11 wherein said reference former means is further comprised of update means operative in response to said decisions and in response to a stream of update error signals proportional to said stream of adaptation error signals for updating the values of said respective coefficients.

13. The invention of claim 11 wherein update means updates the value of each respective coefficient in response to the product of an individual one of the update error signals with the one of said decisions with which said each respective coefficient was multiplied.

14. In a transmission system of the type which includes a near-end terminal and a far-end terminal, the near-end terminal being adapted to transmit to the far-end terminal over a two-way communication line near-end data signals each representing a train of near-end data symbols and to receive over said line from said far-end terminal far-end data signals each representing a train of far-end data symbols, said system further being of the type in which data signals received from the far-end terminal are corrupted by echoes of transmitted near-end data signals, apparatus at said near-end terminal for removing said echoes from said received far-end data signals comprising sampling means for producing at at least the Nyquist rate a stream of samples of said corrupted received far-end data signals, each of said samples being comprised of a far-end data component and an echo component, echo cancelling means operative in response to said near-end data symbols and a stream of adaptation error signals for generating replicas of the echo components of respective ones of said samples, signal processing means for producing a stream of echo compensated samples as a function of the difference between each of said samples and its respective echo replica and for forming decisions as to the values of said far-end data symbols from said echo compensated signals, and means for producing said adaptation error signals as a function of said difference between each one of said samples and the respective replica of its echo component and as a function of a stream of estimate signals, said estimate signals being substantially equal to the far-end data components of associated ones of said samples, said generating means including reference former means for forming said estimate signals as a function of said decisions and said stream of adaptation error signals.

15. The apparatus of claim 14 wherein said generating means is arranged to form each of said adaptation error signals by multiplying an error signal by a predetermined parameter, said error signal being a function of said difference between an individual one of said samples and a function of the replica of its echo component and the estimate signal associated with said individual one of said samples.

16. The apparatus of claim 15 wherein said reference former means includes means for forming each of said estimate signals by multiplying individual ones of said decisions by respective ones of a set of coefficients and summing the resulting products.

17. The apparatus of claim 16 wherein said reference former means is further comprised of update means for updating the value of each of said set of coefficients in response to the product of an individual one of a stream of update error signals with the one of said decisions with which said each set coefficient was multiplied.

18. In an arrangement for processing samples of an incoming signal to form decisions $a_n$, $n = 0,1,2,\ldots$, as to the values of data symbols represented by said signal, said samples having respective data components and echo components, said echo components being derived from an outgoing signal representing a stream of near-end data symbols, a method of generating a replica of the echo component present in each of said samples, said method characterized by the steps of storing P coefficient sequences, forming in response to individual ones of said decisions an estimate $X_{M-D}$ of the data component of the $(M-D)^{th}$ one of said samples in accordance with $$X_{M-D} = \sum_{K=1}^{N/P} W_n^K(i)\hat{a}_{n-K+1} \text{ for } i = mod_P(M),$$

N being a selected number, $W_n^K(i)$ being the value of the $K^{th}$ coefficient in the $i^{th}$ one of said P coefficient sequences and $a_n$ being the most recently formed one of said decisions, and generating said replica in response to the combination of said $(M-D)^{th}$ sample, and said estimate $X_{M-D}$, and in response to ones of said data symbols, generating an updated value $W_{n+1}^K(i)$ of said coefficient in accordance with $$W_{n+1}^K(i) = W_n^K(i) + \gamma E_{(M-D-P)}\hat{a}_{n-K} \text{ for } \begin{cases} K = 1,2\ldots,N/P \\ i = mod_P(M) \end{cases}$$

$E_{(M-D-P)}$ being equal to the combination of the $(M-D-P)^{th}$ one of said samples, the replica of its echo component, and the estimate of its data component and $\gamma$ being a predetermined parameter, and storing said updated value for use in forming subsequent estimates of said data components.

19. A method for processing samples of an incoming signal which is corrupted by echoes of a transmitted signal representing a stream of transmitted near-end data symbols, said incoming signal representing a train of transmitted far-end data symbols and said samples having respective far-end data components and echo components, said method comprised of the steps of generating in response to a stream of adaptation error signals and said stream of transmitted near-end data symbols a replica of each of said echo components, producing a stream of echo compensated signals as a function of the difference between each of said samples and the replica of its echo component, and forming decisions as to the values of said transmitted far-end data symbols from said echo compensated signals, and generating an individual one of said adaptation error signals as a function of said difference between an individual one of said samples and the replica of its echo component and as a function of an estimate signal, said estimate signal being substantially equal to the far-end data component of said individual one of said samples, said generating step including the step of forming said estimate signal as a function of individual ones of said decisions and as a function of at least ones of said stream of adaptation error signals.

20. The method of claim 19 wherein said estimate signal forming step includes the step of linearly combining said individual ones of said decisions.

21. The method of claim 20 wherein said linear combining step includes the steps of generating a plurality of coefficients, multiplying said individual ones of said decisions by respective ones of said coefficients and summing the resulting products.

22. The method of claim 21 wherein said adaptation error signal producing step includes the step of multiplying an error signal by a predetermined parameter, said error signal being a function of said estimate and a function of said difference between said said individual one of samples and said replica of its echo component.

23. The method of claim 22 wherein said estimate forming step further includes the step of updating the value of each of said respective coefficients as a function of said individual ones of said decisions and as a function of said error signal.

24. The method of claim 23 wherein said updating step includes the step of multiplying said error signal with a predetermined parameter.

25. The method of claim 23 wherein said updating step includes the step of multiplying said error signal with the one of said decisions with which said each respective coefficient was multiplied.

* * * * *

UNITED STATES PATENT AND TRADEMARK OFFICE
CERTIFICATE OF CORRECTION

PATENT NO. : 4,535,206

DATED : August 13, 1985

INVENTOR(S) : David D. Falconer

It is certified that error appears in the above-identified patent and that said Letters Patent is hereby corrected as shown below:

Column 2, line 26, "continuosly" should read --continuously--; line 41, "reveiver" should read --receiver--. Column 5, line 37, "reflected" should read --reflect--. Column 6, line 3, "$\hat{a}_n$" should read --$a_n$--; line 3, "$a_n$" should read --$\hat{a}_n$--. Column 8, line 2, "sensititives" should read --sensitivities--; line 36, "$a_n$" should read --$\hat{a}_n$--; line 49, "$a_{n-(N/P)-1}$" should read --$\hat{a}_{n-\frac{(N-1)}{P}}$--. Column 10, line 32, "$W_n^K(i)$" should read --$W_n^K(i)$--; line 47, "$W_{n+1}^K(i)$" should read --$W_{n+1}^K(i)$--; line 59, "$W_n^K(i)$" should read --$W_n^K(i)$--. Column 13, line 48, "$a_n$" should read --$\hat{a}_n$--; line 63, "$W_n^K(i)$" should read --$W_n^K(i)$--; line 65, "$W_n^K(i)$" should read --$W_n^K(i)$--; line 67, "$a_n$" should read --$\hat{a}_n$--.

Column 9, line 5, "$w_n^k(i)$" should read --$W_n^K(i)$--; line 48, "$W_n^K$" should read --$W_n^K$--. Column 10,

UNITED STATES PATENT AND TRADEMARK OFFICE
CERTIFICATE OF CORRECTION

PATENT NO. : 4,535,206

DATED : August 13, 1985

INVENTOR(S) : David D. Falconer

It is certified that error appears in the above-identified patent and that said Letters Patent is hereby corrected as shown below:

line 24, "$a_{n-K}$" should read --$\hat{a}_{n-K}$--. Column 18, line 5, "$W_{n+1}{}^{K}(i)$" should read --$W_{n+1}^{K}(i)$--; line 9, "$W_{n}{}^{K}(i)$" should read --$W_{n}^{K}(i)$--.

Signed and Sealed this

Tenth Day of December 1985

[SEAL]

Attest:

Attesting Officer

DONALD J. QUIGG

Commissioner of Patents and Trademarks